O. E. KOPPLIN.
CRANK AXLE ADJUSTMENT.
APPLICATION FILED JUNE 28, 1919.
1,343,268. Patented June 15, 1920.
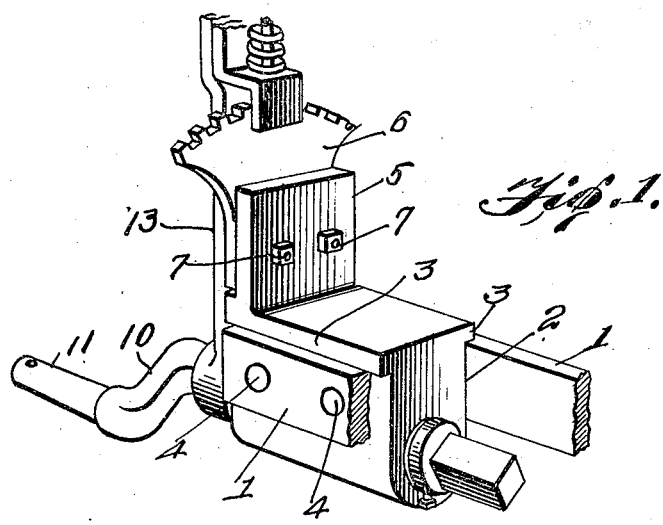
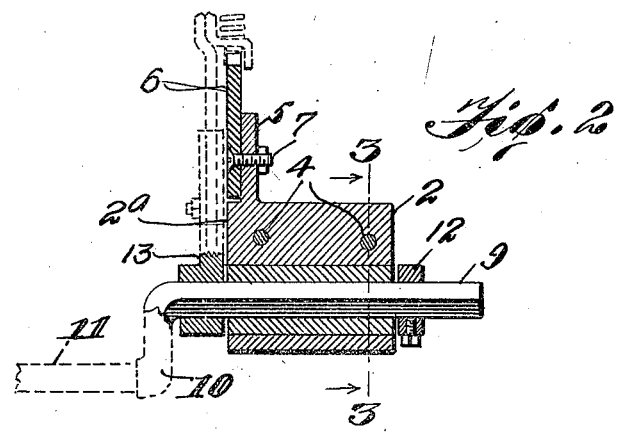
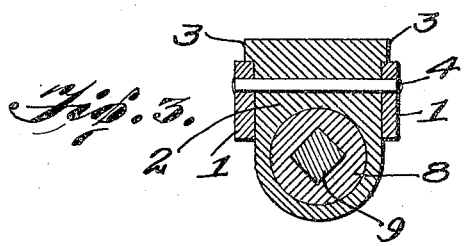
Inventor
OTTO E. KOPPLIN.

UNITED STATES PATENT OFFICE.

OTTO E. KOPPLIN, OF MARION, TEXAS.

CRANK-AXLE ADJUSTMENT.

1,343,268.   Specification of Letters Patent.   Patented June 15, 1920.

Application filed June 28, 1919. Serial No. 307,468.

*To all whom it may concern:*

Be it known that I, OTTO E. KOPPLIN, a citizen of the United States, residing at Marion, in the county of Guadalupe and State of Texas, have invented certain new and useful Improvements in Crank-Axle Adjustments, of which the following is a specification, reference being had therein to the accompanying drawings.

This invention relates to a crank axle adjustment or peculiar means for adjusting the axle of a wheel of a plow or cultivator.

The principal object of the invention is to simplify and produce an efficient crank axle that will efficiently perform its function in connection with the general structure of a plow or cultivator.

With the foregoing object and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a perspective view of an apparatus constructed in accordance with the present invention, while Fig. 2 is a longitudinal sectional view of the apparatus shown in Fig. 1, being partly shown in dotted lines.

Fig. 3 is a sectional view taken on line 3—3, Fig. 2, looking in the direction of the arrows.

Referring to the drawings by numerals, 1, 1 designates parallel bars or plates, and between these plates is positioned the axle-carrying body 2 which is provided with outwardly-extending, horizontal flanges 3 for overhanging the top edges of the plates 1; these flanges 3 project from opposite sides of the body 2 and partly support the body upon the plates, but to fixedly secure the body between the plates, I preferably use pins or rivets 4. Integral with the upper portion of the body 2 is a transversely-positioned, vertical lug or flange 5. This flange 5 is positioned slightly within the outer edge 2ª of the body 2 so that the ratchet plate 6 can be secured by bolts 7 to the front face of the flange 5, and the front face of the plate 6 will be in the same vertical plane or flush with the front end or face 2ª of the body 2 (Fig. 2).

A cylindrical sleeve 8 is rotatably mounted in the body 2, and this sleeve has a square bore within which the squared portion 9 is positioned; this squared portion 9 is bent at 10 at right angles, and integral with the outer end of the right-angular-positioned portion 10 is the spindle 11 upon which a wheel is normally positioned. This squared portion 9, carried within the square bore of the sleeve 8, together with portion 10 and the spindle 11, constitutes a crank axle. A locking collar 12 is mounted upon the squared portion 9 near the inner end of the sleeve 8, preventing the axle as well as the sleeve from being displaced off the body 2 in one direction, whereas the lever 13 will prevent inward movement of the squared portion 9 of the crank axle. This lever 13 coöperates with the ratchet plate 6, in the usual manner, for locking the crank axle in an adjusted position upon the body 2, whereby the spindle 11 will be retained in an adjusted position.

I wish it to be understood that I reserve the right to make such minor alterations and modifications in the construction of my invention as shall appear to one skilled in the art to which this invention relates, which changes or alterations fall fairly within the scope of the appended claims.

What I claim is:

1. In an apparatus of the class described, the combination of a pair of parallel plates, an axle-carrying body positioned between said plates, means on the body and engaging the top of the plates for securing the body thereto, additional means for also fastening the body positively to the plates, a crank axle journaled in said body, and means coöperating with the body and the crank axle for adjusting said axle and retaining it in an adjusted position.

2. In an apparatus of the class described, the combination of a pair of horizontal, parallel plates, an axle-carrying body positioned between said plates and having at its upper edge outwardly-extending, horizontal flanges resting upon the upper edges of the plates, fastening means extending through the plates and the body, said body provided at its upper portion with an integral, transversely-extending, vertical apertured flange, said flange formed back a short distance from the outer edge of the body, a ratchet plate positioned against the outer face of the flange and having its outer face flush with the outer face of the body, fastening means extending through the ratchet plate and the apertures of the flange and securing the ratchet plate to the flange, a horizontal, cylindrical sleeve rotatably mounted in the body and provided with a square bore, a crank axle provided with a spindle and with a squared portion, the squared portion positioned in the square bore of the sleeve, a locking collar on the squared portion of the crank axle contiguous to the inner end of the sleeve, and a lever secured upon the squared portion of the axle at the opposite end of the sleeve and coöperating with the ratchet plate for adjusting the crank axle and retaining the same in an adjusted position.

In testimony whereof I hereunto affix my signature.

OTTO E. KOPPLIN.